United States Patent [19]
Buehler et al.

[11] Patent Number: 6,139,730
[45] Date of Patent: Oct. 31, 2000

[54] MULTICHAMBER GRAVITY OPERATED OIL-WATER SEPARATOR

[75] Inventors: Stephen L. Buehler; Steven E. Whitmire, both of Montgomery, Ala.

[73] Assignee: Jay R. Smith Manufacturing Co., Montgomery, Ala.

[21] Appl. No.: 09/221,452

[22] Filed: Dec. 28, 1998

[51] Int. Cl.[7] ................................................. B01D 17/032
[52] U.S. Cl. .......................... 210/167; 210/241; 210/249; 210/252; 210/259; 210/533; 210/538; 210/540; 210/312; 210/536
[58] Field of Search ...................................... 210/800, 801, 210/802, 805, 807, 513, 532.1, 533, 536, 537, 538, 540, 242.3, 776, 922, 923, 924, 167, 241, 248, 249, 252, 259, 312

[56] References Cited

U.S. PATENT DOCUMENTS

| | | |
|---|---|---|
| 2,284,737 | 6/1942 | Hirshstein . |
| 4,246,112 | 1/1981 | Mausgrover . |
| 4,246,113 | 1/1981 | Mausgrover . |
| 4,268,396 | 5/1981 | Lowe . |
| 5,178,754 | 1/1993 | Batten et al. . |
| 5,431,826 | 7/1995 | Becker et al. . |
| 5,705,055 | 1/1998 | Holloway, Jr. et al. . |

FOREIGN PATENT DOCUMENTS

3739687A1  11/1987  Germany .

*Primary Examiner*—Robert J. Popovics
*Attorney, Agent, or Firm*—William S. Ramsey

[57] ABSTRACT

An automatic oil-water separator which separates wastewater into oil or grease and water fractions is disclosed. The separator does not include any mechanical pumps in its structure and therefore does not generate oil or grease and water emulsions which are characteristic of separators using pumps and which are very difficult to separate. The separator is constructed without moving parts, filters or coalescing plates and operated without the addition of chemicals or the use of electricity.

17 Claims, 6 Drawing Sheets

FIG. 6

MULTICHAMBER GRAVITY OPERATED OIL-WATER SEPARATOR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention relates to the separation of greases and oils from wastewater using automatic processes and apparatus.

2. Description of Related Art Including Information Disclosed Under 37 CFR 1.97 and 37 CFR 1.98.

Many industrial processes involve the generation of wastewater which is a mixture or an emulsion of oil or grease and water. In particular, services and wash areas for trucks and automobiles, heavy equipment, fork lifts, and engine rebuilders of ten generate wastewater from cleaning processes which combine oil and grease and water. In addition, process water used in asphalt plants, with compressors and generators, and in other industrial plants often use water for cooling. Such process water often becomes contaminated with oil and grease which leaks from the equipment. Finally, maintenance of a clean environment requires the removal of oil and grease from parking lot run-off, contaminated groundwater, holding ponds, and the washdown from oil and gasoline spills. All these and other processes generate wastewater which is a mixture or emulsion of oil or grease and water and which must be separated into the component fractions oil or grease and water. Grease, oil, fats, and other materials found in wastewater which have a density less than that of water will be referred to collectively in this application as "oil or grease" or as "oil". Water contaminated with oil or grease will be referred to collectively as "wastewater". Such wastewater cannot simply be released to the environment because of contamination to the rivers and estuaries which are the ultimate recipients of such waters.

There is a problem with the disposal of such wastewater in sewers because of the tendency of grease to coagulate on the internal walls of pipes and plug the lumen of the pipes, a particular problem at bends and valves. In addition, many jurisdictions charge a fee for the disposal of wastes having a high biological oxygen demand, such as wastewater, or may forbid its disposal in a municipal sewage system because of toxicity associated with the oil or grease which disrupts the sewage plant operation. Finally, the salvage value of oil or grease recovered from wastewater provides an additional economic incentive for separation and recovery of the oil and grease.

Grease separators generally include a tank in which the wastewater stream is allowed to stand while the grease and oil separate. The grease and oil accumulate at the top of the tank because grease and oil is less dense than is water. Conventional systems have electrical pumps and fluid level sensors which are used to transfer the wastewater stream or oil stream from one chamber to another. Such pumps inevitable create a mechanical emulsion of grease or oil and water which is difficult to separate and tends to confound the purpose of a grease separator. In addition, the use of electric pumps with a grease or oil separator carries an unavoidable element of fire hazard.

The present invention is free of pumps thereby avoiding pump-caused emulsion formation and avoiding any hazard of fire associated with electrical pumps and sensors.

U.S. Pat. No. 2,284,737 utilizes a continuous flow process to separate liquids of different specific gravities. The localized rates of flow and the direction of the flow of the incoming waste water are controlled to provide a constant body of water in the separator receptacle. This system uses a single chamber which is partially sectored with baffles.

U.S. Pat. No. 4,246,112 discloses an oil-water separator which stores and allows both the oil phase and the water phase to be reused.

U.S. Pat. No. 4,246,113 discloses an oil-water separator which contains two compartments. The separator is designed to restrict the flow of water from the first compartment into the second compartment which increases the residence time of the oil-water in the first compartment and thereby increases the separation of oil therein.

U.S. Pat. No. 4,268,396 discloses an oil recovery apparatus used for removing grease and/or oil from dish water and showing a preferred means for straining debris from the influent flow of contaminated water.

U.S. Pat. No. 5,178,754 discloses an apparatus for reducing the solids and oil/grease components of a water mixture. It includes devices for separating solids from liquids in a flow of solids and liquids and for separating oil/grease from water in a flow of oil/grease and water.

The present invention is advantageous over those in the prior art in that it is multichambered yet free of electrical pumps and sensors. This provides superior separation of oils and grease from wastewater by avoiding the generation of mechanical emulsions of oil or grease and water, which confound the purpose of the separator. In addition, the present invention avoids the fire hazard associated with electrical pumps and sensors.

SUMMARY OF THE INVENTION

The oil-water separator of this application operates without the use of mechanical pumps and thereby avoids the unnecessary generation of difficult to resolve emulsions of oil or grease and water in the wastewater being cleaned. The separator has several chambers which perform different functions. A sedimentation chamber is used to collect the particles in the wastewater. The gravity-induced separation of oil or grease from water occurs in all chambers of the separator. In the separation chambers a skimmer is used to collect the oil or grease phase and transport it to a oil chamber. A drainage pipe is used to moved the water phase from one chamber to another. A water return is used to remove the water phase from the oil chamber for recycling through the oil-water separator. Finally, one or more polishing chambers are used to insure that water essentially free of oil or grease and essentially free of particles emerges from the separator.

The objective of this invention is to provide a multichamber automatic separator of wastewater containing oil or grease, particles, and water having no mechanical pumps thereby minimizing the generation of oil-water emulsions.

Another object is to provide a multichamber automatic separator of wastewater containing oil or grease, particles, and water in which the flow of fluids through pipes is minimized thereby minimizing the generation of oil-water emulsions.

Another object is to provide a multichamber automatic separator of wastewater containing oil or grease, particles, and water having no electrical connections thereby eliminating a source of fire hazard.

Another objective of this invention is to provide a multichamber automatic separator of wastewater containing oil or grease, particles, and water having a solids interceptor chamber with a sloping floor which traps solids suspended in the wastewater.

Another objective of this invention is to provide a multichamber automatic separator of wastewater containing oil or grease, particles, and water having a solids interceptor chamber with vanes which direct the flow of fluid so that solids are deposited on the floor of the chamber.

Another objective of this invention is to provide an automatic separator of wastewater containing oil or grease, particles, and water in which the separator contents may be heated by adding hot water.

A final objective of this invention is to provide an automatic separator of wastewater containing oil or grease, particles and water which operates economically and with minimal environmental impact.

DETAILED DESCRIPTION OF THE INVENTION

Figure 1:
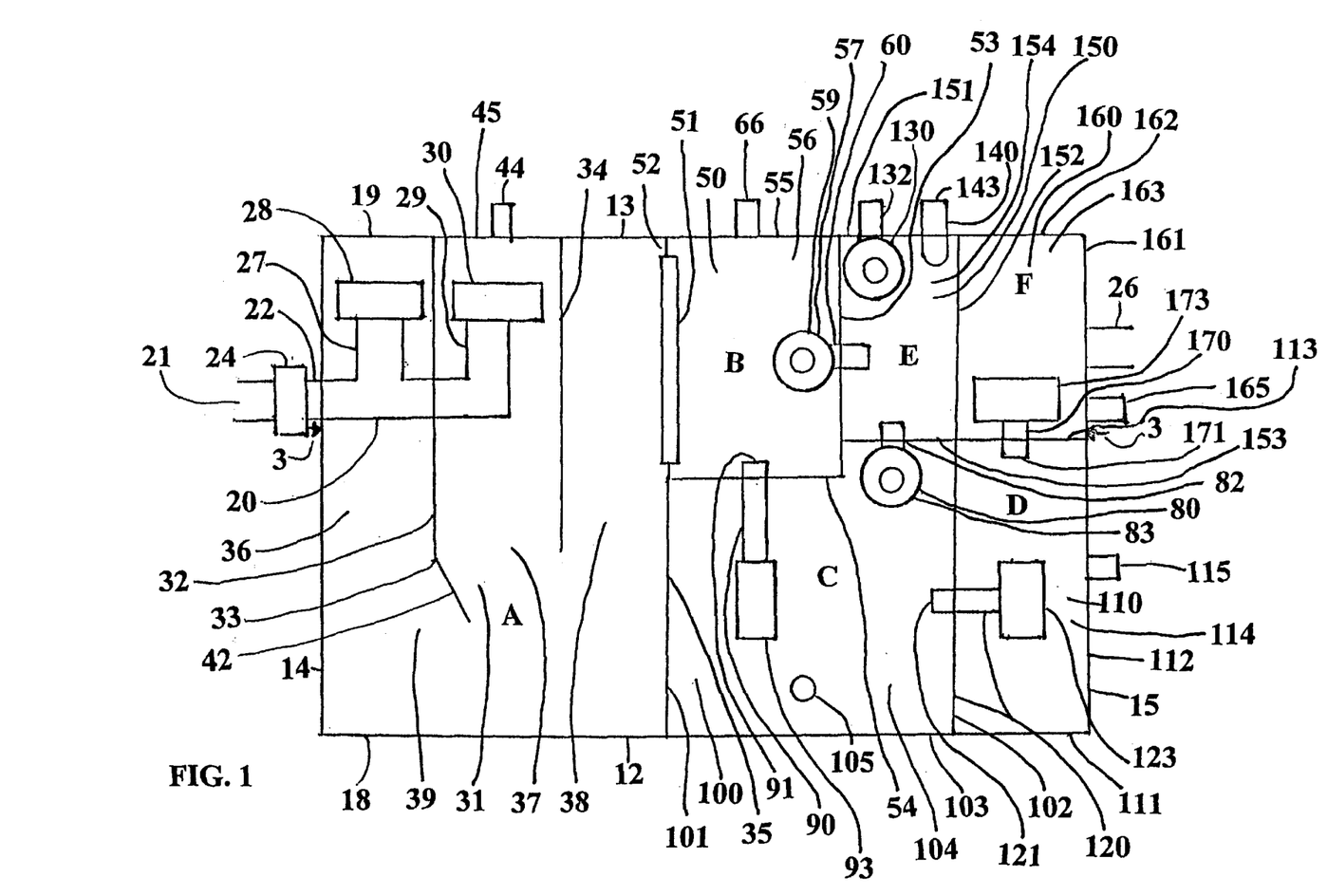
FIG. 1 is the top view of multichamber automatic separator with the top cover removed.

FIG. 1 is a diagrammatic representation of the top view of the oil-water separator with the cover removed. The first chamber or sedimentation chamber A 31 is formed by the front chamber A wall 18, inlet wall 14, rear chamber A wall 19, and right chamber A wall 35. Chamber A 31 is subdivided by first chamber A divider 32 and second chamber A divider 34 into left subchamber 36, middle subchamber 37 and right subchamber 38. The first chamber A divider has a bend 33 and a first chamber A divider end portion 42.

Figure 2:
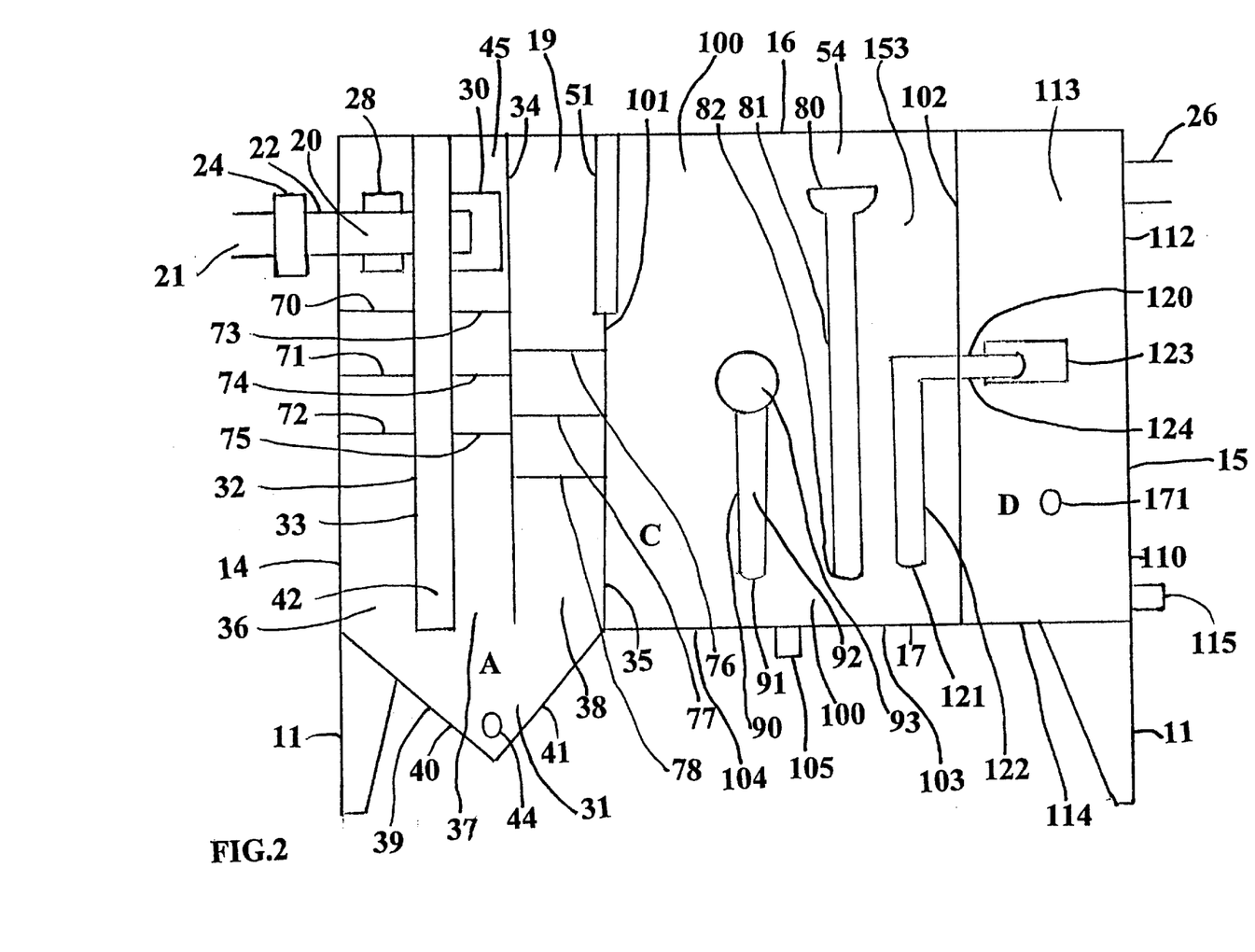
FIG. 2 is a side view of a cross section of the multichamber automatic separator with the front wall removed.
Figure 3:
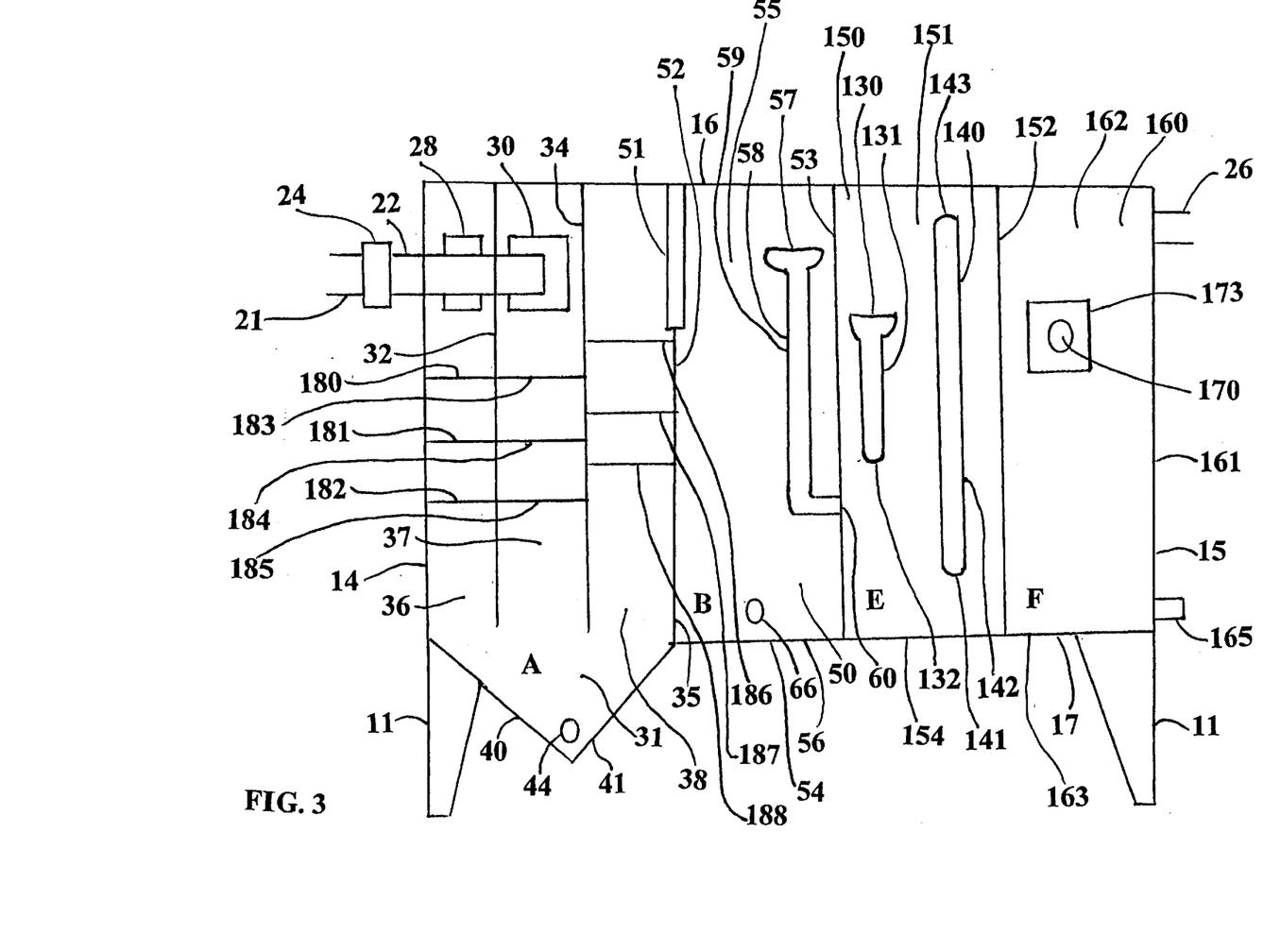
FIG. 3 is a side view of a cross section of the multichamber automatic separator taken along line 3—3 of FIG. 1.

Wastewater flows into chamber A through a wastewater supply line 21 which is connected to a shut off valve 24 which is connected to the inlet pipe 22. Inside chamber A, the wastewater is carried by the manifold 20 to the first inlet arm 27 and emerges into the left subchamber 36 through the T-shaped first inlet arm distributor 28, which is open on both ends. The wastewater is carried by the manifold 20 to the second inlet arm 29 and emerges into the middle subchamber 37 through the t-shaped second inlet arm distributor 30, which is open on both ends. The flow of the wastewater is slowed by vanes in the subchambers, which are shown in FIGS. 2 and 3. The wastewater flows from the left subchamber 36 around the first chamber A divider 32 and its first chamber A divider end portion 42 and, along with wastewater from the middle subchamber 37, enters the right subchamber 38. While flowing in chamber A the wastewater deposits sediment which is negatively buoyant on the chamber A floor 39. Chamber A floor 39 is divided into two panels which form a V-shape and are depicted in FIGS. 2–5. Sludge is removed from chamber A through the sludge draw off 44 located at the bottom of chamber A rear wall 45.

A portion of the right chamber A wall 35 is in common with initial separation chamber B 50 and is termed the left chamber B wall 52. A screen 51 is mounted on the left chamber B wall 52 in the upper portion of the wall. This screen is used to trap positive and neutral buoyant particles in chamber A. It is important that this screen be mounted in the upper portion of left chamber B wall 51. Mounting lower on the wall results in excessive clogging of the screen by positive and neutral buoyant particles. In addition, the mounting of the screen as described allows both the oil or grease layer at the top of the wastewater and the separated water layer to pass from chamber A into chamber B while retaining the particles in chamber A.

Figure 6:
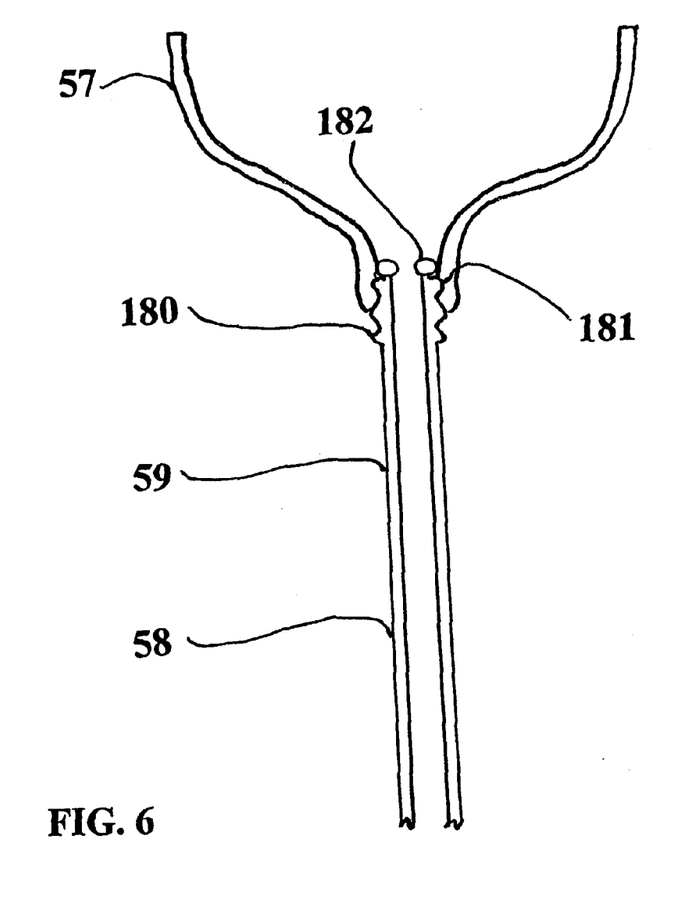
FIG. 6 is a cross-section view of the connection of a skimmer head and skimmer riser tube.

Initial separation chamber B 50 is formed by the front chamber B wall 54, left chamber B wall 52, rear chamber B wall 55, right chamber B wall 53 and chamber B floor 56. The oil layer is removed from chamber B by the first skimmer 59. Additional detail on the construction of skimmers is shown in FIG. 6. the oil layer enters the first skimmer head 57, flows down the first skimmer riser pipe (shown in FIGS. 3) and flows through the first skimmer outlet 60 which is a elbow pipe which penetrates the right chamber B wall 53. The oil flows into chamber E 150. It is important that the height of the first oil skimmer head 57 be adjusted to the correct height so that primarily oil is skimmed from chamber B and deposited in chamber E.

The water layer is removed from chamber B by the first transfer pipe 90 which penetrates the front chamber B wall 54 and removes the water to chamber C 100. The first transfer pipe inlet 91 is located near the floor of chamber B.

A port for removal of sediment, chamber B cleanout 66 is located on the rear chamber B wall.

Separation chamber C 100 is formed by front chamber C wall 103, right chamber A wall 35, front chamber B wall 54, right chamber B wall 53, front chamber E wall 153, right chamber C wall 102 and chamber C floor 104. Water from chamber B flows through the first transfer pipe 90 to the T-shaped first transfer pipe distributor 93 which is open on both ends and flows into chamber C. Whatever oil or grease what remains in the water is separated in chamber C and the floating oil level is removed by the second skimmer 80. The oil enters the second skimmer head 83, flows through a riser tube (shown in FIG. 2) and enters the second skimmer outlet 82 which is an elbow pipe which penetrates the front chamber E wall 153. The oil is deposited in chamber E.

The water layer is removed from chamber C by the second transfer pipe 120 which penetrates the right chamber C wall 102 and removes the water to chamber D 110. The second transfer pipe inlet 121 is located near the floor of chamber C.

A port for removal of sediment, chamber C clean out 105, is located on the chamber C floor 104.

Although the separator depicted in FIGS. 1–5 has two separation chambers, B 50 and C 100, the separators of this invention may have only one separation chamber or more than two separation chambers.

Polishing chamber D 110 is formed by front chamber D wall 111, right chamber C wall 102, right chamber D wall 112, rear chamber D wall 113, and chamber D floor 114. Water from chamber C flows through the second transfer pipe 120 to the T-shaped second transfer pipe distributor 123 which is open on both ends and flows into chamber D.

Whatever oil or grease and particulate matter remains in the water transferred into chamber D is trapped in chamber D and is removed by periodic cleaning.

The water layer is removed from chamber D by the third transfer pipe 170 which penetrates the rear chamber D wall 113 and removes the water to chamber F 160. The third transfer pipe inlet 171 is located near the floor of chamber D.

A port for removal of sediment, chamber D clean out 115, is located on the right chamber D wall 112.

The final polishing chamber F 160 is formed by rear chamber D wall 113, right chamber F wall 161, right chamber E wall 152, rear chamber F wall 162, and chamber F floor 163. Water from chamber D flows through the third transfer pipe 170 to the T-shaped second transfer pipe distributor 173 which is open on both ends and flows into chamber F.

Whatever oil or grease and particulate matter remains in the water transferred into chamber F is trapped in chamber F and is removed by periodic cleaning.

The water layer is removed from chamber F by the outlet pipe 26 for transfer to an approved sewage disposal.

A port for removal of sediment, chamber F clean out 165, is located on the right chamber F wall 161.

The oil chamber, chamber E 150 receives oil from the first 59 and second 80 skimmers which remove oil from chambers B and C, respectively. The oil in chamber E is removed to some approved oil or grease storage outside the oil-water separator by the third skimmer 133. Oil enters the third skimmer head 130, flows down a riser pipe (shown in FIG. 3) and exits the oil-water separator via the third skimmer outlet 132, an elbow pipe which penetrates the rear chamber E wall 151.

A certain amount of water inevitably accompanies the oil from chambers B and C as the oil is transferred to chamber E. The water in chamber E is removed by the water return 140. The water return inlet (shown in FIG. 3) is located near the chamber E floor 154. The water passes through a riser (shown in FIG. 3 and enters the water return outlet 143, an elbow pipe which penetrates the rear chamber E wall 151. Water from chamber E is transferred back to the pit for recycle through the oil-water separator because it is too contaminated with oil for release through the outlet 26.

FIG. 2 is a front view of the oil-water separator with the front wall 12 (in FIG. 1) removed.

The separator is supported by legs 11. The separator floor 17 is flat where it extends below chambers C 100, and D 110 and is V- shaped below chamber A 31 with a left panel 40 and a right panel 41. Also shown is the inlet wall 14 and outlet wall 15. The wastewater supply line 21 is connected to the shut off valve 24 which is connected to the inlet pipe 22 which brings wastewater into the separator. The outlet pipe 26 removes the separated water from the separator.

Sedimentation chamber A 31 is formed by the, inlet wall 14, rear chamber A wall 19, and right chamber A wall 35. Chamber A 31 is subdivided by first chamber A divider 32 and second chamber A divider 34 into left subchamber 36, middle subchamber 37 and right subchamber 38. The first chamber A divider has a bend 33 and a first chamber A divider end portion 42 which controls the flow of wastewater through chamber A.

Wastewater flows into chamber A through a wastewater supply line 21 which is connected to a shut off valve 24 which is connected to the inlet pipe 22. Inside chamber A, the wastewater is carried by the manifold 20 to the first inlet arm 27 and emerges into the left subchamber 36 through the t-shaped first inlet arm distributor 28, which is open on both ends. The wastewater is carried by the manifold 20 to the second inlet arm 29 and emerges into the middle subchamber 37 through the t-shaped second inlet arm distributor 30, which is open on both ends. The flow of the wastewater is slowed by vanes in the subchambers. The vanes in the left subchamber 36 and middle subchamber 37 extend from the rear wall to the front of the subchambers and are sloped so that the rear end of each vane is higher than the front end. FIG. 2 shows the front end of the upper left subchamber vane 70, the front end of the middle left subchamber vane 71, the front end of the lower left subchamber vane 72 and the front end of the upper middle subchamber vane 73, the front end of the middle middle subchamber vane 74, and the front end of the lower middle subchamber vane 75. The vanes in the right subchamber are sloped in the opposite direction to those in the left subchamber with the rear end of each vane lower than the front end. FIG. 2 shows the front end of the upper right subchamber vane 76, the front end of the middle right subchamber vane 77, and the front end of the lower right subchamber vane 78. The vanes slows the flow of wastewater through chamber A and are important in causing the sedimentation of negatively buoyant particles on the floor of chamber A 39.

Chamber A floor 39 is divided into two panels which form a V-shape, left chamber A floor panel 40 and right chamber A floor panel 41. Sludge is removed from chamber A through the sludge draw off 44 located at the bottom of chamber A rear wall 45.

A portion of the screen 51 is mounted on the left chamber B wall 52 (in FIG. 1) in the upper portion of the wall is shown in FIG. 2.

Chamber C 100 is formed by right chamber A wall 35, front chamber B wall 54, right chamber B wall 53, front chamber E wall 153, (which together form the rear wall of chamber C) a right chamber C wall 102, and chamber C floor 104.

The water layer is removed from chamber B (visible in FIG. 1) by the first transfer pipe 90 which penetrates the front chamber B wall 54 and removes the water to chamber C 100. The first transfer pipe inlet 91 is located near the floor of chamber B. The first transfer pipe riser 92 is attached to the front chamber B wall 54. The T-shaped first transfer pipe distributor 93 open at each end is attached to the top of the first transfer pipe riser.

Whatever oil or grease what remains in the water is separated in chamber C and the floating oil level is removed by the second skimmer 80. The oil enters the second skimmer head 83, flows through the second skimmer riser tube 81 and enters the second skimmer outlet 82 which is an elbow pipe which penetrates the front chamber E wall 153. The second skimmer riser tube is attached to the front chamber E wall 153. The oil is deposited in chamber E.

The water layer is removed from chamber C by the second transfer pipe conduit 120 which penetrates the right chamber C wall 102 and removes the water to chamber D 110. The second transfer pipe inlet 121 is located near the floor of chamber C, the water enters the second transfer pipe riser 122, passes through an elbow into the second transfer pipe arm which penetrates the right chamber C wall 102 and then enters the T-shaped second transfer pipe distributor 123 which is open on each end and flows into chamber D.

A port for removal of sediment, chamber C clean out 105, is located on the chamber C floor 104.

Chamber D 110 is formed by right chamber C wall 102, right chamber D wall 112, rear chamber D wall 113, and chamber D floor 114. Water from chamber C flows through the second transfer pipe 120 to the T-shaped second transfer pipe distributor 123 which is open on both ends and flows into chamber D. Water flows from chamber D through the third transfer pipe inlet 171 which penetrates the rear chamber D wall 113 and transfers the water to chamber F (seen in FIGS. 1 and 3).

A port for removal of sediment, chamber D clean out 115, is located on the right chamber D wall 112.

FIG. 3 is a cross-section front view of the oil-water separator taken along the line 3—3 of FIG. 1. FIG. 3 is the same as FIG. 2, except that chambers B, E, and F are depicted and chambers C and D are not shown.

In FIG. 3, the rear ends of the vanes are shown. The vanes in the left subchamber 36 and middle subchamber 37 extend from the rear wall to the front of the subchambers and are sloped so that the rear end of each vane is higher than the front end. FIG. 3 shows the rear end of the upper left subchamber vane 180, the rear end of the middle left subchamber vane 181, the rear end of the lower left subchamber vane 182 and the rear end of the upper middle subchamber vane 183, the rear end of the middle subchamber vane 184, and the rear end of the lower middle subchamber vane 185. The vanes in the right subchamber are sloped in the opposite direction to those in the left subchamber with the rear end of each vane lower than the front end. FIG. 3 shows the rear end of the upper right subchamber vane 186, the rear end of the middle right subchamber vane 187, and the rear end of the lower right subchamber vane 188.

A portion of the right chamber A wall 35 is in common with chamber B 50 and is termed the left chamber B wall 52. A screen 51 is mounted on the left chamber B wall 52 in the upper portion of the wall.

Chamber B 50 is formed by the left chamber B wall 52, rear chamber B wall 55, right chamber B wall 53 and chamber B floor 56. The oil layer is removed from chamber B by the first skimmer 59. The oil layer enters the first skimmer head 57, flows down the first skimmer riser pipe 58 and flows through the first skimmer outlet 60 which is a elbow pipe which penetrates the right chamber B wall 53. The first skimmer riser pipe is attached to the right chamber B wall 53. The oil flows into chamber E 150. It is important that the height of the first oil skimmer head 57 be adjusted to the correct height so that primarily oil is skimmed from chamber B and deposited in chamber E.

A port for removal of sediment, chamber B cleanout 66 is located on the rear chamber B wall 55.

The oil chamber, chamber E 150 receives oil from the first 59 and second 80 skimmers which remove oil from chambers B and C, respectively. The oil in chamber E is removed to some approved oil or grease storage outside the oil-water separator by the third skimmer 133. Oil enters the third skimmer head 130, flows down a riser pipe (shown in FIG. 3) and exits the oil-water separator via the third skimmer outlet 132, an elbow pipe which penetrates the rear chamber E wall 151.

The water in chamber E is removed by the water return 140. The water return inlet 141 is located near the chamber E floor 154. The water passes through a water return riser 142 and enters the water return outlet 143, an elbow pipe which penetrates the rear chamber E wall 151. The water return 140 is attached to the rear chamber E wall 151.

The final polishing chamber F 160 is formed by right chamber F wall 161, right chamber E wall 152, rear chamber F wall 162, and chamber F floor 163. Water from chamber D flows through the third transfer pipe 170 to the T-shaped third transfer pipe distributor 173 which is open on both ends and flows into chamber F.

Whatever oil or grease and particulate matter remains in the water transferred into chamber F is trapped in chamber F and is removed by periodic cleaning.

The water layer is removed from chamber F by the outlet pipe 26 for transfer to an approved sewage disposal.

A port for removal of sediment, chamber F clean out 165, is located on the right chamber F wall 161.

Figure 4:
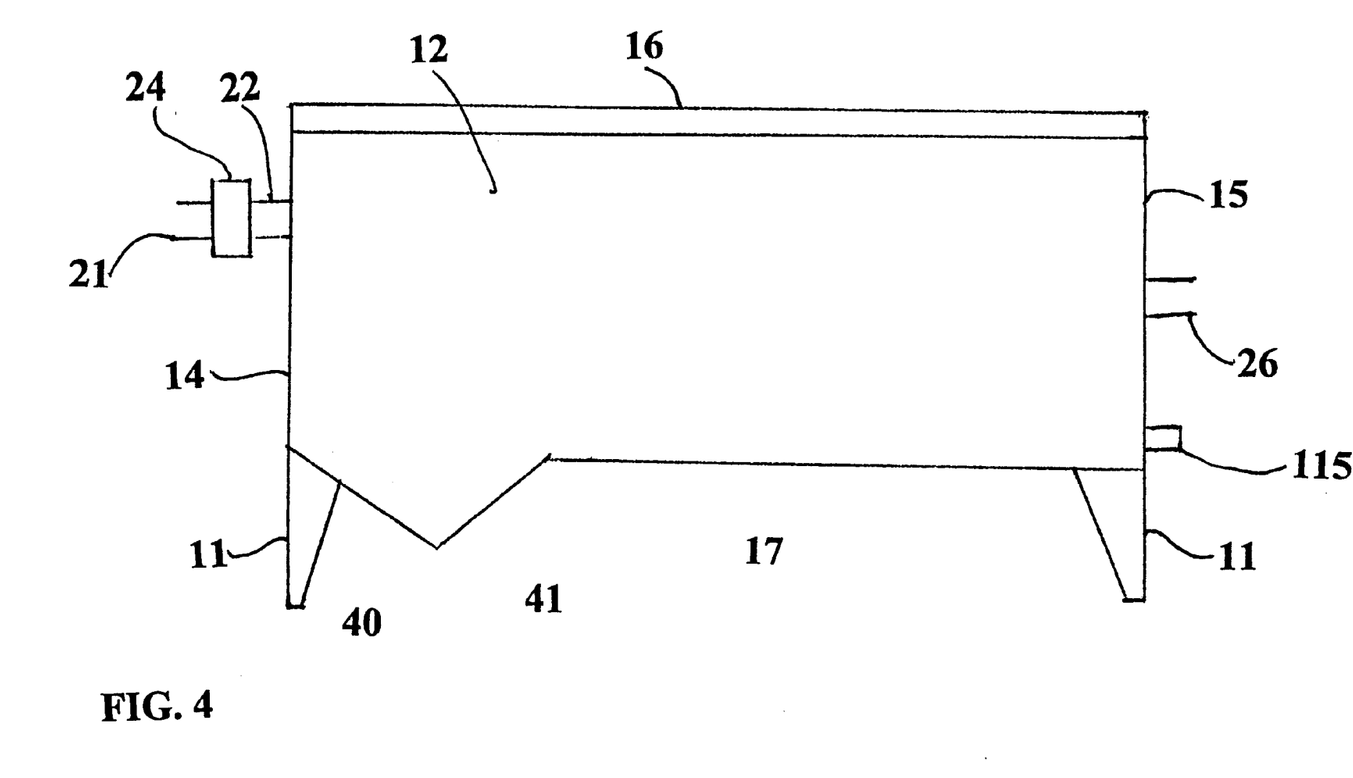
FIG. 4 is the front view of the multichamber automatic separator.

FIG. 4 is the front view of the multichamber separator. The separator is supported by legs 11. The separator floor 17 is flat where it extends below chambers B 50, C 100, D 110, E 150 and F 160 (all in FIG. 1) and is V- shaped below chamber A 31 (in FIG. 1) with a left portion 40 and a right portion 41. Also shown is the inlet wall 14, outlet wall 15, front wall 12, and lid 16. The wastewater supply line 21 is connected to the shut off valve 24 which is connected to the inlet pipe 22 which brings wastewater into the separator. The outlet pipe 26 removes the separated water from the separator.

Chamber D cleanout 115 is shown at the bottom of the exit wall 15.

Figure 5:
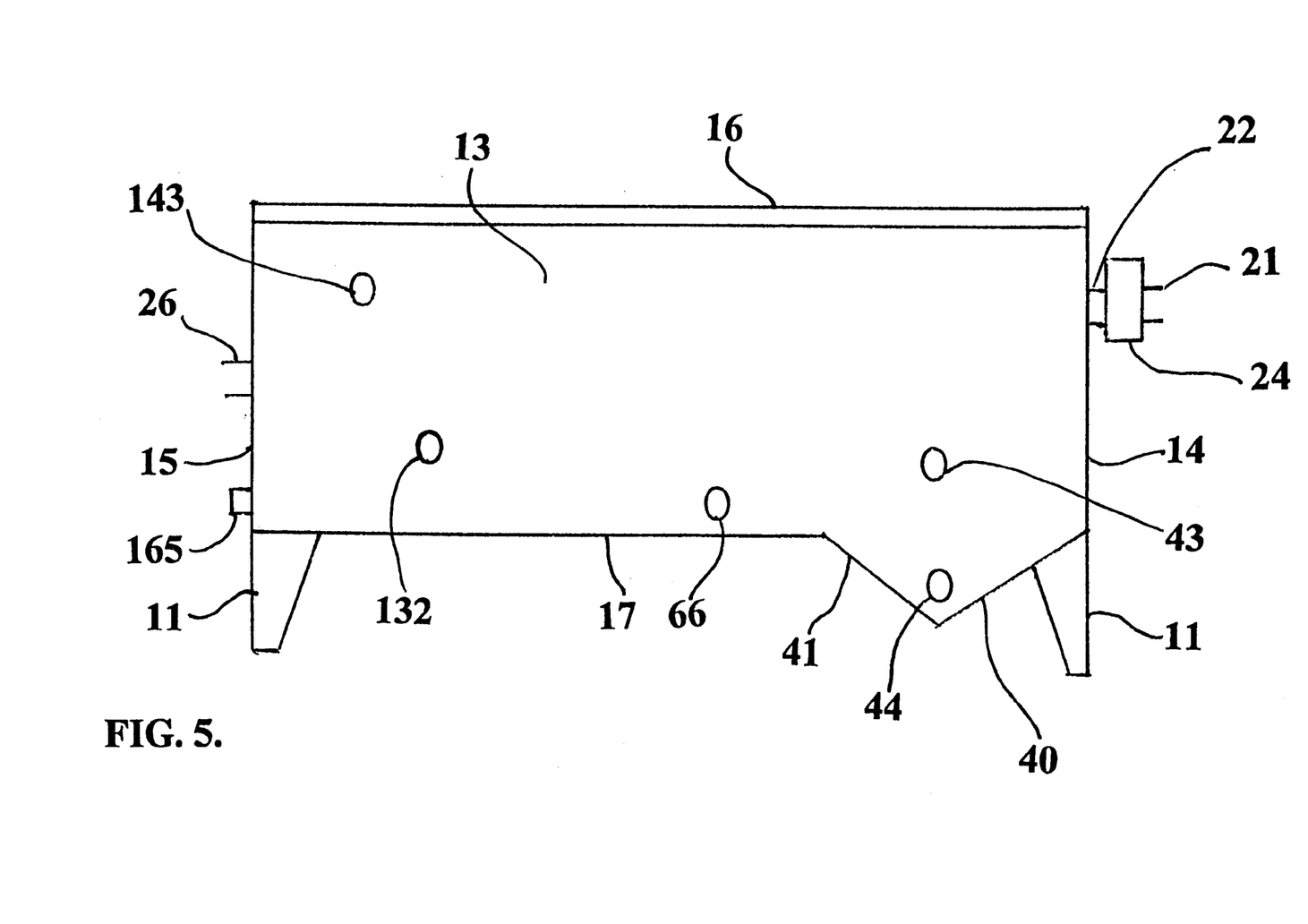
FIG. 5 is the rear view of the multichamber automatic separator.

FIG. 5 is the rear view of the multichamber separator. The separator is supported by legs 11. The separator floor 17 is flat where it extends below chambers B 50, C 100, D 110, E 150 and F 160 (all in FIG. 1) and is V- shaped below chamber A 31(in FIG. 1) with a left portion 40 and a right portion 41. Also shown is the inlet wall 14, outlet wall 15, rear wall 13, and lid 16. The wastewater supply line 21 is connected to the shut off valve 24 which is connected to the inlet pipe 22 which brings wastewater into the separator. The outlet pipe 26 removes the separated water from the separator.

Chamber F cleanout 165 is shown at the bottom of the exit wall 15. The sludge cleanout 44 is shown just above the intersection of the left portion 40 and right portion 41 of the chamber A floor. The sludge cleanout is a port used to remove sedimented particles from chamber A. A optional heater connector 43 is shown in the rear wall of chamber A (45 in FIG. 1). This connection is used for the admission of hot water into the separator when desired to maintain the fluidity of the oil and grease in the wastewater. Chamber B cleanout 66 is a port for the removal of sludge from chamber B 50 (in FIG. 1). The third skimmer outlet 132 is a port which removes oil from the third skimmer which removes oil from the oil chamber, chamber E 154 (in FIG. 1). The water return outlet to pit 143 is a port which removes water from the water return 140 (in FIG. 1) which removes water from the lower portion of chamber E 150 (in FIG. 1).

FIG. 6 is a cross section of a skimmer showing the adjustable connection of the skimmer head with the riser tube. It is important that means be available for the positive adjustment of the height of the skimmer head with respect to the oil-water separator. If the skimmer head is too high, the oil or grease layer will be incompletely removed. If the skimmer head is too low, excessive water will accompany the oil layer into the oil chamber. Suitable means for adjusting the height of the skimmer head include using a threaded connections (as shown in FIG. 6) or using a clamping arrangement which secures the skimmer head at a certain position on the skimmer riser pipe. An arrangement in which the skimmer head may slide up and down on the skimmer riser tube and is not positively secured was not adequate to provide efficient operation of the oil-water separator.

FIG. 6 is a cross-section view of part of skimmer 59, in particular skimmer head 57, and skimmer riser tube 58. Also shown is the threaded portion 180 of skimmer riser tube 58, the threaded portion 181 of skimmer head 57, and the O-ring used to seal the connection between skimmer head and riser tube. The height of the skimmer tube may be adjusted easily and positively by rotating the skimmer head.

The oil-water separator is constructed of suitable strong and corrosion resistant material, such as steel or aluminum or fiberglass. It rests on a pad capable of supporting the unit, such as a pad of concrete, or may be mounted in a truck or on a trailer for portable use.

The operation of the oil-water separator will be described for an example which involves a truck washing operation. In this operation, the trucks are washed with a detergent solution. The wastewater contaminated with oil or grease and particles is collected in a sump pit. It is then pumped to the oil-water separator. It is desirable to eliminate the use of mechanical pumps from the process because they cause the generation of difficult to separate oil-water emulsions. In this case, the only pump is that which brings the wastewater from the sump pit to the oil-water separator.

In FIG. 1 the wastewater enter from wastewater supply line 21 through the shut off valve 24 into the inlet pipe where is flows into first chamber A 31 of the separator through two distributors 28 and 30. As the water traverses chamber A the vanes (70–78 and 180–188) in the left 36, middle 37, and right 38 subchambers of chamber A act to slow the flow of wastewater and to cause the sedimentation of particles of negative and neutral density on the floor of chamber A 39. These particles are periodically removed through the sludge draw off 44 in the rear wall 45 of chamber A. The wastewater then passes through a screen 51 which is mounted in the upper half of the left chamber B wall 52. Left chamber B wall 52 separates the first chamber and the initial separation chamber B. This screen keeps positively buoyant particles in chamber A. It is important that it be mounted in the upper half of the wall because otherwise negatively and neutrally buoyant particles tend to become trapped in the screen, thus causing clogging of the screen and requiring frequent cleaning.

At all stages in the oil-water separator the oil or grease is lighter than the water and therefore floats on the top of the water. In chamber B the floating oil is removed by the first skimmer 59 to the oil chamber E 150. The water from chamber B is removed by the first transfer pipe 90 to chamber C 100.

In chamber C a further separation of any residual oil occurs. The oil layer is removed by the second skimmer 80 to the oil chamber B. The water layer is removed by the second transfer pipe 120 to polishing chamber D 110.

In the polishing chambers further sedimentation of residual particles occurs. The water from chamber D is removed by the third transfer pipe 170 to the final polishing chamber F 160.

Further sedimentation of any particles occurs in chamber F and the now separated water is removed from the oil-water separator by outlet pipe 26.

Each chamber has provisions for removing separated material. chamber A has sludge draw off port 44 for removal of sludge. Chamber B has cleanout 66; chamber C has cleanout 105, chamber D has cleanout 115, and chamber F has cleanout 165, all ports for the removal of sedimented material. Oil chamber E has third skimmer outlet 132 for removal of separated oil from the oil-water separator for further storage or reuse. Chamber E also has water return 140 which takes excess water from chamber E and returns it to the pit for recycling through the oil-water separator. All the chambers can be drained to the pit.

The oil-water separator of this example is designed for treatment of wastewater containing not more than 15% oil or grease and 85% water. A separator having a capacity of 112 cubic feet requires a concrete pad 9 feet long, 5 feet wide and 4 inches thick. the separator has a length of 84 inches width of 48 inches, and height of 36 inches (excluding the legs) an 2 inch inlet pipe and 3 inch outlet pipe. Such a separator can treat wastewater at a rate of up to 25 gallons per minute.

Such an oil-water separator is portable and can be transported easily in a truck and brought to a site where it is required or can be permanently installed. It is modular in design so that modifications or additions may be make to keep operations in compliance with regulatory standards.

The separator has no moving parts, no filters, and no coalescing plates. No electricity or chemicals are required for its operation.

It will be apparent to those skilled in the art that the examples and embodiments described herein are by way of illustration and not of limitation, and that other examples may be used without departing from the spirit and scope of the present invention, as set forth in the claims.

I claim:

1. An oil-water separator comprising:

a multiplicity of chambers for the gravity-stimulated separation of wastewater into sedimented particles, oil or grease, and water without using pumps or sensors comprising a first chamber into which the wastewater flows having vanes and at least one divider which enhance the sedimentation of suspended particles from the wastewater, an initial separation chamber separated from the first chamber by a wall, the wall having a screen mounted in the upper half of the wall, the wastewater flowing from the first chamber through the screen into the initial separation chamber, one or more separation chambers for the separation of oil or grease and water, each separation chamber having a skimmer which removes a layer of oil or grease which floats on the water after the wastewater has separated into a oil or grease layer and a water layer, a oil chamber which receives oil from the skimmers, the oil chamber having a skimmer which removes the layer of oil or grease for storage outside of the oil-water separator, the oil chamber having a water return which removes water from the oil chamber, the skimmer comprising a skimmer mouth, a skimmer outlet to the oil chamber, and a skimmer riser tube connecting the skimmer mouth and skimmer outlet, the skimmer mouth connected to the skimmer riser tube by means which allow positive adjustment of the height of the skimmer mouth, each separation chamber having a transfer pipe for draining water from the separation chamber into a separation chamber having a common wall with the separation chamber being drained or into a polishing chamber having a common wall with the separation chamber being drained, one or more polishing chambers which have a common wall with a separation chamber or polishing chamber being drained, each polishing chamber receiving water from an adjacent separation chamber or polishing chamber through a drainage pipe, and a final polishing chamber which is drained of water by an outlet pipe.

2. The separator of claim 1 further comprising a V-shaped floor in the first chamber.

3. The separator of claim 1 further comprising an end portion attached to a divider at an angle to the divider.

4. The separator of claim 1 wherein the vanes are sloped.

5. The separator of claim 1 wherein the skimmer mouth is adjusted by means of a threaded connection between the skimmer riser tube and the skimmer head.

6. The separator of claim 1 wherein the transfer pipe comprises an inlet in the water layer in the separation chamber being drained, a conduit pipe which passes through the common wall, a riser, and a distributor which releases the water into the receiving separation chamber or polishing chamber.

7. The separator of claim 1 wherein the drainage pipe comprises an inlet in the water layer in the separation chamber or polishing chamber being drained, a conduit pipe which passes through the common wall, and a distributor which releases the water into the receiving polishing chamber.

8. The separator of claim 1 wherein the water return further comprises a pipe having an inlet near the bottom of the oil chamber, a riser, and an outlet near the top of the oil chamber used to remove water from the oil chamber.

9. The separator of claim 1 wherein each chamber has cleanout means for removal of oil, water, sludge, or particles.

10. The separator of claim 9 wherein the cleanout means is a port.

11. The separator of claim 9 wherein all chambers can be drained to a pit.

12. The separator of claim 1 wherein the wastewater comprises not more than 15% oil or grease.

13. The separator of claim 1 wherein the separator is portable.

14. The separator of claim 1 wherein the separator is permanently installed.

15. The separator of claim 1 which is constructed of steel, aluminum, or fiberglass.

16. The separator of claim 1 which has no moving parts, no filters, and no coalescing plates.

17. The separator of claim 1 further comprising legs which support the separator.

* * * * *